Figure 1:
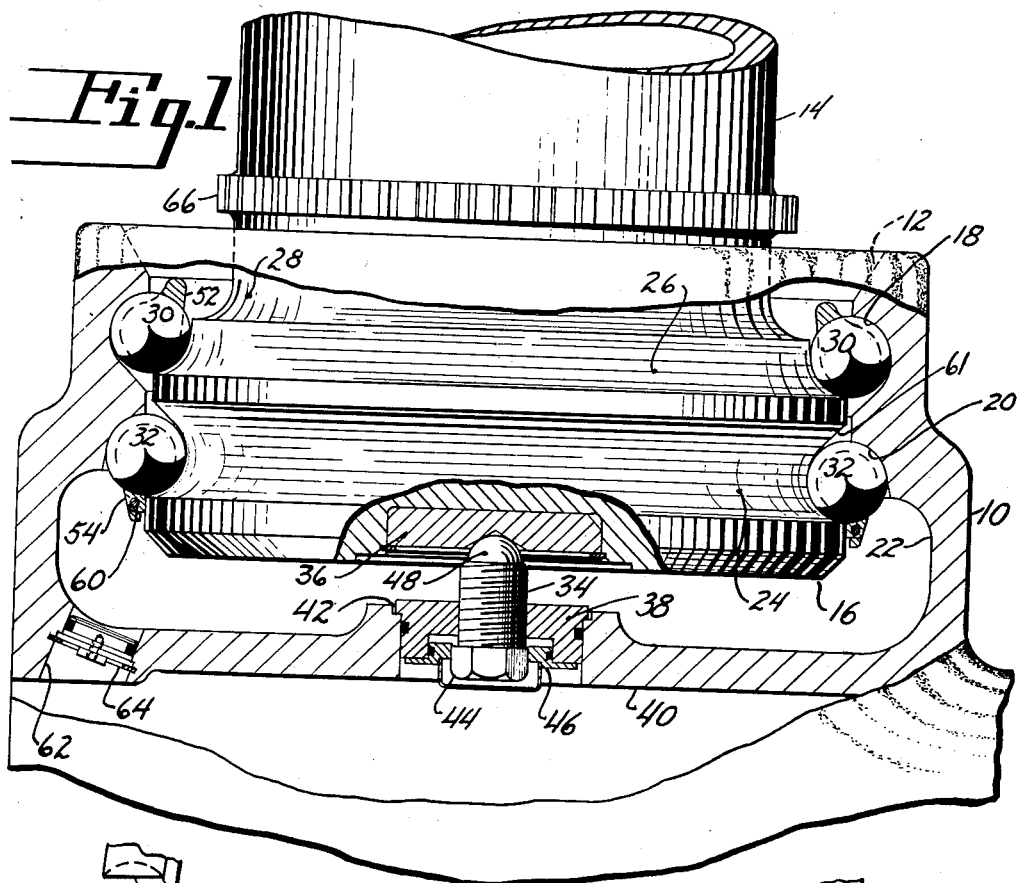

Feb. 21, 1956 M. E. CUSHMAN 2,735,733
BLADE RETENTION BEARING
Filed April 10, 1952 2 Sheets-Sheet 1

INVENTOR
MAURICE E. CUSHMAN
BY
*Godfrey B. Speir*
ATTORNEY

Feb. 21, 1956　　　M. E. CUSHMAN　　　2,735,733
BLADE RETENTION BEARING
Filed April 10, 1952　　　　　　　　　　　2 Sheets-Sheet 2

INVENTOR
MAURICE E. CUSHMAN
BY
ATTORNEY

United States Patent Office 2,735,733
Patented Feb. 21, 1956

2,735,733

BLADE RETENTION BEARING

Maurice E. Cushman, Verona, N. J., assignor to Curtiss-Wright Corporation, a corporation of Delaware Application April 10, 1952, Serial No. 281,643

1 Claim. (Cl. 308—174)

This invention relates to multiple row ball bearings and is particularly applicable for retaining the blades of aircraft propellers in propeller hubs.

In bearings where maximum strength is required in the components, it is desirable to make the race members as integral units, without any splits or openings which would produce points of high stress in the structure during operation. Particularly in a bearing for retaining blades in aircraft propellers, where lightness and strength are mandatory, the efficient use of material is important to provide maximum strength and minimum weight. Blade retention bearings are highly loaded thrust bearings but must also assume radial loading. To assume the thrust forces, it is desirable to use multiple row ball bearings. In the past, assembly of multiple row ball bearings has been obtained by several arrangements, including the use of split races, bearing retaining nuts, or ports in the hub structure through which bearing balls may be fed in the case where the bearing races are respectively integral with the propeller blade and the propeller hub.

As inferred previously, the discontinuity in highly stressed materials resulting from splits, holes, screwed nuts and the like, reduces the efficiency of the structure. In the case of races integral with blade and hub structures, hardening of the race surfaces is accomplished after machining; if discontinuities, openings or unsymmetrical sections exist in the structures, great difficulty is experienced in securing uniform hardness of the races.

It is an object of this invention to provide a multiple row ball bearing arrangement in which the ball races are integral with structural portions of the environmental assembly and in which the structural components of the assembly are symmetrical and free from unsymmetrical openings, splits and the like which may be termed "stress raisers."

Briefly, in carrying forward the principles of my invention, an integral bearing member is provided witht a plurality of ball grooves and an integral journal member is provided with a corresponding plurality of ball grooves. When the system is assembled with balls engaging the respective grooves, the stress pattern within the structural members is smooth and uninterrupted to enable optimum design of the components from a weight standpoint.

In understanding the detailed arrangement of the invention including the mode of assembly and disassembly, reference may be made to the attached drawings in conjunction with the detailed description below.

Figure 2:
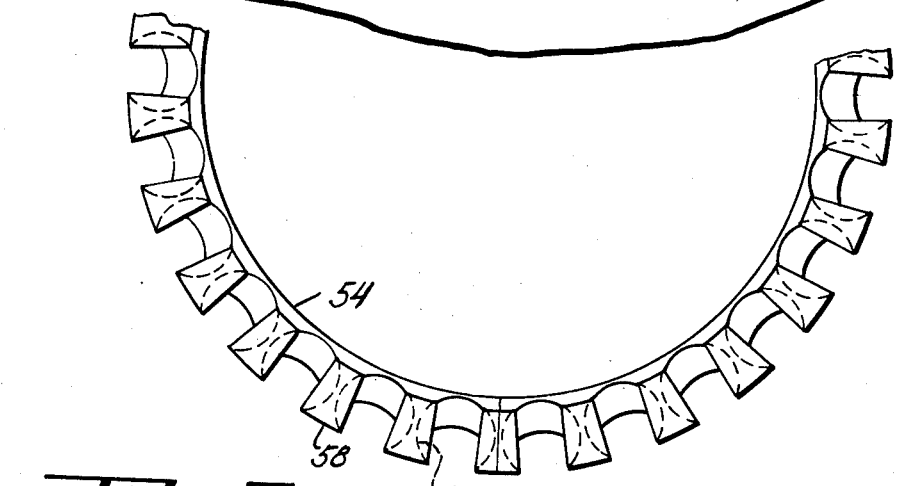
Figure 3:
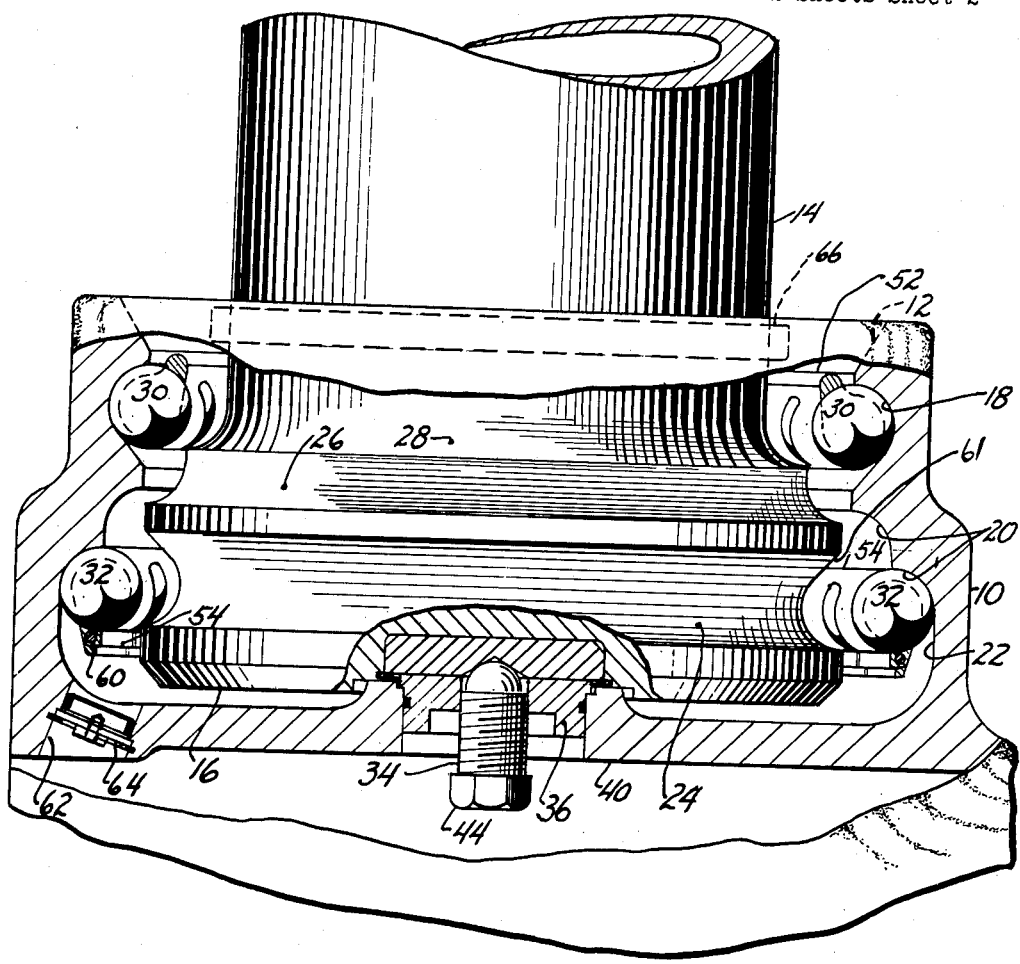
Figure 4:
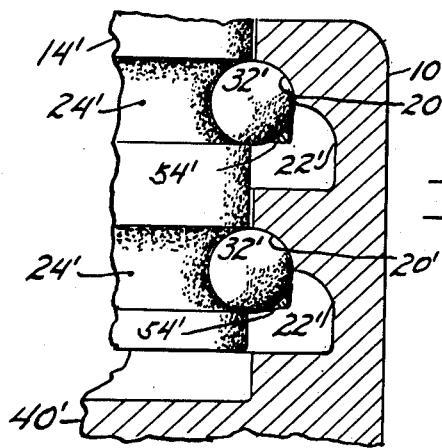

In the drawings, Fig. 1 is an elevation of the bearing arrangement of this invention partly broken away to show the arrangement of the parts. Fig. 2 is a plan of one of the bearing retainers used in the invention, and Fig. 3 is an elevation somewhat similar to Fig. 1 showing the parts in position for assembly and disassembly and Fig. 4 is a fragmentary section of the invention in alternative form.

An external socket or bearing member 10 is provided, open at one end as at 12. A journal member 14 having a butt 16 is inserted into socket 10. As shown, the socket 10 is the blade socket of a controllable aircraft pitch propeller and the journal member 14 comprises a part of a propeller blade.

Within the socket 10 are formed two axially spaced ball race grooves 18 and 20, the upper ball race as shown having substantially semi-circular cross-section while the lower ball race 20 as shown has substantially quarter-circular cross-section. The lower edge of the race 20 blends into an enlarged annular relief groove or recess 22 for a purpose which will shortly be explained. The butt 16 is formed with a substantially semi-circular cross-section race groove 24, and above this in axially spaced relation is formed a race groove 26 of quarter-circular cross-section, the upper portion of which lies adjacent an annular relief groove 28 of substantially reduced diameter. In the assembled arrangement as shown in Fig. 1, the grooves 26 and 18 have concentric surfaces and between them, a row of balls 30 is disposed. Also, the grooves 24 and 20 lie in concentric relation and between them, a row of balls 32 is disposed. The races as drawn, provide for the assumption of radial loads and of thrust loads in the direction where upward thrust is applied to the member 14, the member 10 being held against upward movement.

The bearing elements are held in this relationship by a preloading jack 34, the upper end of which engages a pad 36 fitted to the blade butt 16 and the threaded portion of which engages a nut 38 fitted to the structural floor portion 40 of the socket 10. The nut 38 is splined to the portion 40 at 42 to prevent turning. When the jack is set up as shown in Fig. 1, the jack having a hexagon head 44 for tightening, a locking device 46 of any suitable type is engaged with the head 44 and the nut 38 to prevent backing off of the jack during operation. The engagement of the jack 34 with the blade pad 36 may be by means of a low friction bearing arrangement of any suitable type or by a ball 48 as shown, seated in the jack and engaging the pad.

The relief groove 28 in the member 14 as shown, is faired into the cylindrical wall of the member 14, the diameter of the member 14 being approximately equal to the overall diameter of the butt 16 less the diameter of two balls 30. The overall diameter of the relief groove 22 in the socket 10 is approximately the diameter of the butt 16 plus the diameter of two balls 32. The relief groove 22 may, if desired, be elongated in an axial direction as shown but this groove 22 could be of semi-circular cross-section to enable the fitting of balls 32 therein. In similar fashion, the relief groove 28 in the member 14 could be of semi-circular cross-section.

The balls 30 are contained in a flexible retainer 52, the retainer being split at one point so that the string of balls may be stretched out linearly. In similar fashion, the balls 32 are contained in a retainer 54 which is split at one point to enable the ball string to be stretched out. The retainers 52 and 54 preferably comprise molded plastic units having a large number of ball sockets 56 therein, defined by projections 58 which prevent the balls from coming in contact with one another. The retainers and projections are so arranged to allow the balls contained therein to project slightly for contact with the surfaces of the ball race grooves. I have found that molded nylon provides a rather effective ball retainer.

Reference may now be made to Fig. 3 which shows the method of assembly of the bearing. Prior to insertion of the member 14 into the socket 10, the retainer 54 with its balls 32 is inserted in the socket to occupy the relief groove 22. The retainer, incidentally, is provided with a snap ring 60 which tends to hold the retainer and balls in a circle whose diameter is the operating diameter during bearing operation. By spreading the ends of the retainer apart the ball and retainer assembly will be enlarged, and the balls will engage the relief groove 22. The jack 34 will have been backed out or downwardly as shown to enable lowering of the butt 16 by approximately ½ ball diameter from the operative position. One or more metal strips are inserted within the socket 10 to hold the balls 32 in the relief groove 22 to enable the butt 16 to move all the way down into the socket to the position shown. After the butt 16 has been inserted in the socket, the holding strips which had been inserted from the open end of the socket are removed and the balls 32 in the retainer 54 move radially inwardly to engage the groove surface 24 in the member 14.

The string of balls 30 in their retainer 52 is then inserted through the open end of the socket into the relief groove 28 of the member 14 and by working the retainer 52 into the groove progressively, the balls 30 may be moved outwardly so that the balls engage the surface of the socket race groove 18. Thereupon, the jack 34 may be raised, raising the member 14 so that the race surface 26 engages the balls 30, and so that the balls 32 engage the race surface 20. This brings the parts into the operating relationship shown in Fig. 1.

For disassembly of the bearing, the jack 34 is lowered to the position of Fig. 3. Then the balls 30 may be removed by displacing them into the relief groove 28 from which they may be pulled upwardly and out of the assembly. The retainer 54 normally brings the balls 32 against the race 24. When the butt 16 is lowered, a ramp 61, part of the groove 24, urges the balls outwardly into the relief groove 22 after the balls have cleared the edge of the groove 20. An opening 62 is provided in the socket portion 40, closable by a plug 64, through which access may be had to the inner part of the bearing. By inserting a probe through this opening, the balls 32 may be moved outwardly all the way into the relief groove 22 and may be held in the outward position by insertion of holding strips of metal between the butt 16 and the socket 10. When the balls 32 are all in the relief groove 22, the member 14 may be drawn upwardly and out of the socket after which the balls 32 with their retainer may be removed from the socket.

From the foregoing description it will be seen that a two row ball bearing for thrust and radial loads is provided by the invention, utilizing solid integral inner and outer ball races having maximum strength and rigidity for the mass of material involved in the structure. No separation, nuts, or joints are required for bearing assembly on account of the relief grooves 22 and 28 which enable loading of the balls into the bearing.

In an aircraft propeller, the member 14 comprises a part of the propeller blade. In order to rotate the blade 14 for pitch change with respect to the socket 10, a spline flange 66 is secured to the member 14 for engagement by suitable pitch change gearing, not shown. The pitch change gearing is mounted outside of the hub and socket 10.

It will be noted that both the butt 16 and the socket 10 are annular structures without protruberances or discontinuities. This enables use of simple fabrication techniques, and particularly, enables uniform hardening of the race groove surfaces after the members are machined, the race grooves being ground after hardening.

I consider that the invention includes within its scope the use of multiple row bearings involving three or more ball rows. In such arrangements, the top row may embody the relief groove 28 to enable ball loading, along with race grooves 18 and 26; multiple lower rows may be utilized, wherein, for each row, the race grooves 20 and 24 and the relief groove 22 are duplicated. Duplication of the lower rows (balls 32') may be used with or without the top row (balls 30). Also, duplication of the top row including balls 30, race grooves 18 and 26 and relief grooves 28 may be utilized, with or without using the lower ball row and its race and relief grooves.

Fig. 4 shows a modification along the lines of the above suggested alternatives. The journal member 14' has a plurality of race grooves 24'. The bearing member 10' has a plurality of race grooves 20' adjacent to each of which is a relief and loading groove 22'. In assembling this arrangement, balls 32' are placed in all of the grooves 22' and the journal member 14' is installed with the grooves 24' opposite the grooves 22'. Spring retainers 54' pull the balls into the grooves 24', and the member 14' is raised so that the balls 32' engage the races 20'.

Though several embodiments illustrating the invention have been shown and described, it is to be understood that the invention may be applied in other and various forms. Changes may be made in the arrangements, without departing from the spirit of the invention. Reference should be had to the appended claim for definitions of the limits of the invention.

I claim:

A bearing arrangement including an integral annular socket, a circular butt inserted within the socket, the butt external diameter being slightly smaller than the socket internal diameter, said butt and socket each having a plurality of axially spaced ball race grooves formed integrally therein, rows of balls between the butt and socket contacting opposed race grooves, said race grooves each having a depth of substantially a ball radius from said butt external diameter and said socket internal diameter, said bearing arrangement including a relief groove in the butt intercepting the outermost butt race groove at its smallest diameter, said relief groove having a depth relative to said butt external diameter substantially equal to a ball diameter, said relief groove being disposed outwardly from the outermost butt race groove, a relief groove in the socket intercepting the innermost socket race groove at its largest diameter, said socket relief groove having a depth relative to said socket internal diameter substantially equal to a ball diameter, said socket relief groove being disposed inwardly from the innermost socket race groove, said socket and butt being relatively axially movable to bring the butt race groove into the plane of the socket relief groove and to bring the socket race groove into the plane of the butt relief groove for installation and removal of the rows of balls relative to respective sets of grooves, and being axially movable to bring the socket and butt race groove into coplanar relation so that installed balls bear on the surfaces of respective race grooves.

References Cited in the file of this patent

UNITED STATES PATENTS

| 2,098,100 | Kaiser | Nov. 2, 1937 |
| 2,315,574 | Anderson | Apr. 6, 1943 |
| 2,395,867 | Hackethal | Mar. 5, 1946 |
| 2,425,938 | Hoover | Aug. 19, 1947 |
| 2,460,910 | Sheets et al. | Feb. 8, 1949 |
| 2,504,737 | Sharpes | Apr. 18, 1950 |
| 2,533,415 | Anderson | Dec. 12, 1950 |
| 2,650,864 | Mergen | Sept. 1, 1953 |
| 2,652,123 | Kearns | Sept. 15, 1953 |

FOREIGN PATENTS

| 494,812 | Great Britain | Nov. 1, 1938 |
| 546,510 | Great Britain | July 16, 1942 |
| 821,543 | France | Dec. 7, 1937 |